US007826944B2

(12) United States Patent
Oesterling et al.

(10) Patent No.: US 7,826,944 B2
(45) Date of Patent: Nov. 2, 2010

(54) CONFIGURABLE VEHICLE BUS STORAGE CACHE MECHANISM

(75) Inventors: Christopher L. Oesterling, Troy, MI (US); Fahd Z. Laghrari, Commerce Township, MI (US); Carl J. Hering, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 992 days.

(21) Appl. No.: 11/610,923

(22) Filed: Dec. 14, 2006

(65) Prior Publication Data

US 2008/0147250 A1 Jun. 19, 2008

(51) Int. Cl.
*H04L 29/08* (2006.01)
*G06F 17/30* (2006.01)

(52) U.S. Cl. ............... 701/33; 701/2; 701/35; 711/118; 342/50

(58) Field of Classification Search ............... 701/33, 701/2, 35; 709/216, 219, 232; 711/118–146; 342/50
See application file for complete search history.

(56) References Cited

U.S. PATENT DOCUMENTS

2005/0182534 A1* 8/2005 Legate et al. ............... 701/29
2007/0174467 A1* 7/2007 Ballou et al. ............... 709/227

* cited by examiner

*Primary Examiner*—Tan Q Nguyen (57) ABSTRACT

A remotely configurable telematics unit cache provides for selective caching of data of interest to a remote caller. The configurable caching system ensures that selected data is available when the vehicle is not in operation and the telematics unit is not powered on. A remote caller can remotely configure the telematics unit cache to selectively store data of interest. Subsequently, the telematics module can accept calls from the caller and the cached information can be pulled. Thus, the configurable cache allows a remote caller to selectively and positively configure the cache to store desired data to be later uploaded without requiring a call-back from the telematics unit and without limiting the cached data to predetermined data groups.

20 Claims, 5 Drawing Sheets

FIG. 5

CONFIGURABLE VEHICLE BUS STORAGE CACHE MECHANISM

TECHNICAL FIELD

The invention relates generally to data communications to and from mobile vehicle telematics units, and more particularly relates to a system and method for selectively caching vehicle data in a remotely configurable off-line cache.

BACKGROUND OF THE INVENTION

Automobiles continue to become more capable and easier to use, both as a mode of transportation and as a communication center when traveling. For example, many vehicles now come equipped with an on-board telematics unit for supplying connectivity between the vehicle (and the vehicle user in some cases), and other entities such as other users, call centers, databases, entertainment venues, and so on. Not only does this connectivity create a better user experience when traveling, but it also allows for better service related to the vehicle.

For example, as will be discussed hereinafter, data related to vehicle systems may be accessible by the telematics unit. This data may be used for on-board or off-board diagnostic purposes and/or to provide information to a user or service center. However, the periods during which the vehicle is powered on tend to occur during peak wireless usage hours, and so data receipt and transmission may be expensive at those times. On the other hand, when the vehicle is not powered on, the wireless rates may be improved, but telematics unit is also not generally active at those times. A system is needed to enhance the data connectivity of mobile devices in this and other respects.

The foregoing discussion is provided for the user's convenience and general information and no portion of this section should be presumed to be a discussion of prior art unless the term "prior art" is used in relation thereto.

BRIEF SUMMARY OF THE INVENTION

While aspects of the invention will be discussed in detail below, this brief summary of the disclosure provides an overview of certain elements of the described examples.

The invention relates generally to a system that provides for a configurable cache for selectively caching data of interest to a remote caller while overcoming the shortcomings of the prior art. In one example the disclosed system provides for caching data in a configurable cache so that the data is available when the vehicle is not in operation and the telematics unit is not generally powered on. A remote caller can remotely configure the telematics unit cache to selectively store data of interest. Subsequently, even when the vehicle is off, the telematics module can accept calls from the call center and the cached information can be pulled. For this reason, the cache that is available when the unit is off (and that may also but need not be available when the unit is on) is referred to herein as the off-line cache. Thus, the configurable cache allows a remote caller to selectively and positively configure the cache to store desired data to be later uploaded without requiring a call-back from the telematics unit and without limiting the cached data to predetermined data groups.

In a further example, the caching is configured to occur in keeping with a time factor. The time factor may be a time and/or date, interval, frequency, etc. that defines the time(s) at which data is collected by the telematics controller and cached. This in turn provides the ability to collect selected data during peak use hours, but to upload the data during off peak hours.

Other objects and advantages of the invention will become apparent upon reading the following detailed description and upon reference to the drawings.

DESCRIPTION OF AN EXEMPLARY EMBODIMENT

Before describing the invention in detail, an exemplary environment in which the invention may operate will be described. It will be appreciated that the described environment is for purposes of illustration only, and does not imply any limitation regarding the use of other environments to practice the invention.

Figure 1:
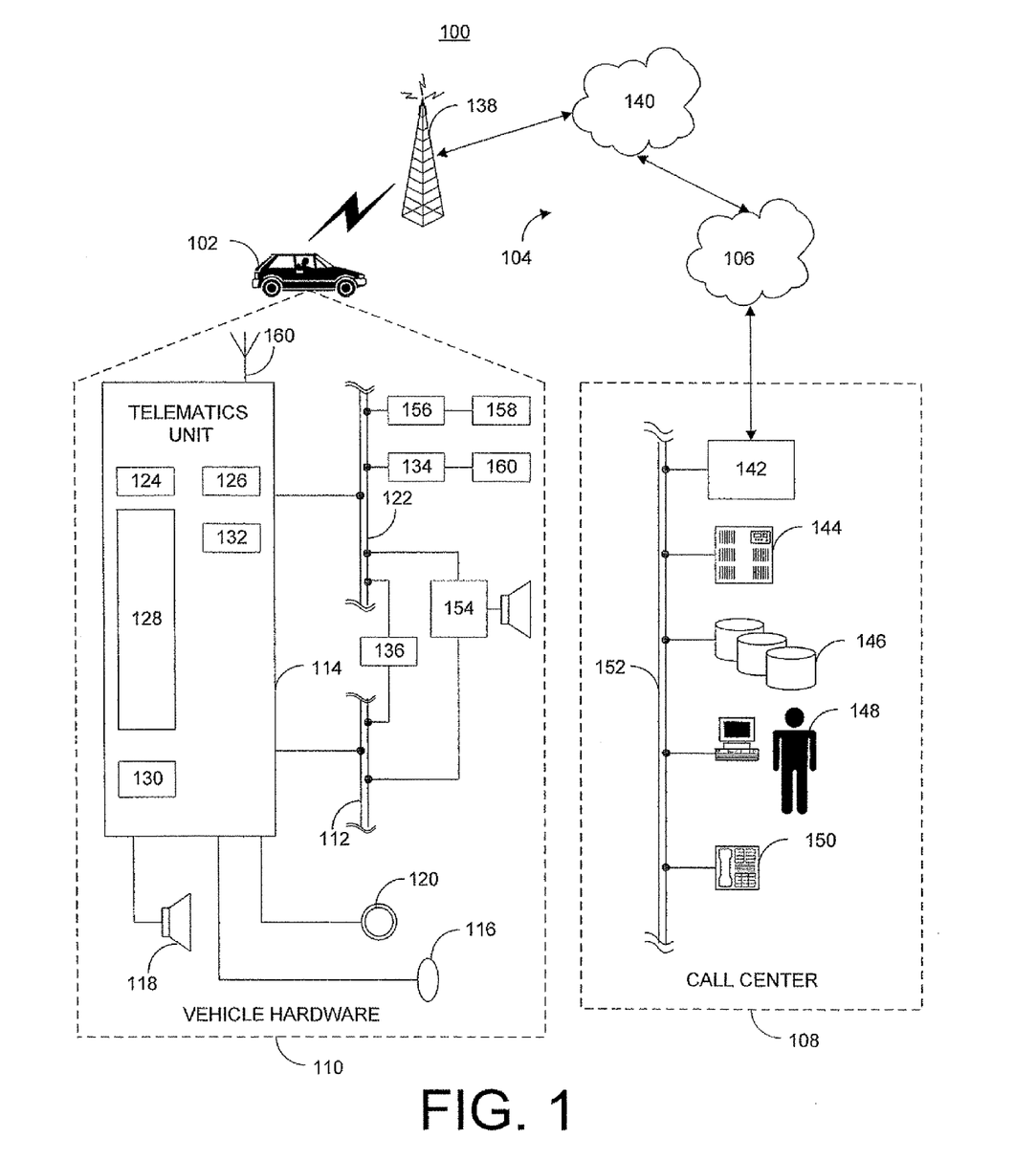
FIG. 1 is a schematic view of an example communication system within which examples of the present invention may be used.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100, however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. I is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 1I0 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push-button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 160, connected to various sensor interface modules 134 are operatively connected to the vehicle bus 122. Examples vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/based station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The examples herein will disclose a preferred technique and system for configurably caching data in a telematics unit cache so that the data is available when the vehicle is not in operation and the telematics unit is not generally powered on. In particular, the remote caller can remotely configure the telematics unit cache to selectively store data of interest. Subsequently, even when the vehicle is off, the telematics module can accept calls from the call center and the cached information can be pulled. Thus, the configurable cache allows a remote caller to configure the cache to store desired data to be later uploaded without requiring a call-back from the telematics unit and without limiting the cached data to predetermined data groups.

The methods of the following examples are ideally employed in an environment including a telematics-equipped vehicle and wholly or partially wireless communications infrastructure as described above by reference to FIG. 1. It will be appreciated that the illustration of FIG. 1 describes an exemplary system, and that many of the elements of FIG. 1 are not essential to the operation of the invention described in the various examples herein.

As discussed above, data related to vehicle systems may be accessible by the telematics unit and may be made available by the telematics unit to remote callers, such as a call center, service center, etc. However, in order to save on communication costs, it is desirable to communicate wirelessly with the telematics unit to retrieve such data during off-peak wireless usage hours, e.g., from 12:00 am to 5:00 am. Unfortunately, during these hours, the user is typically not in the vehicle, and hence the vehicle is not on, and the telematics unit is generally not fully active.

Certain telematics technologies have the ability to cache a predetermined set of data, e.g., remaining oil life percentage, odometer information, etc., from various modules and components on the vehicle bus, as well as Diagnostic Trouble Codes (DTCs). Such systems may make this data available to remote callers upon request when the telematics unit is not otherwise active. However, the cache is not configurable and cannot provide many parameters of interest to remote callers. For example, the existing technology does not allow polling of an inactive telematics unit to retrieve satellite radio usage data, calendar information, and so on.

In these examples, a system for providing and accessing a configurable bus storage cache will be described in greater detail. In one example, the system allows definable diagnostics requests to be cached. This would allow the telematics unit to cache data such as DTCs, PIDs, and DIDs. This would avoid the need for the call center to call the vehicle again during peak hours to obtain non-cached data. For example, because satellite radio usage information is contained in a module that is unavailable when the vehicle is off, the call center cannot pull the information unless it happens to call when the driver is in the vehicle.

Under certain circumstances, a call center could use vehicle data upload (VDU) technology to prompt the telematics unit to call back when fully powered, i.e., when the vehicle is running. However effective this may be, it does present a likelihood of incurring additional peak airtime usage at substantial cost. On the other hand, the system described herein can allow the telematics unit to configurably cache desired information to be pulled during off-peak hours.

Figure 2:
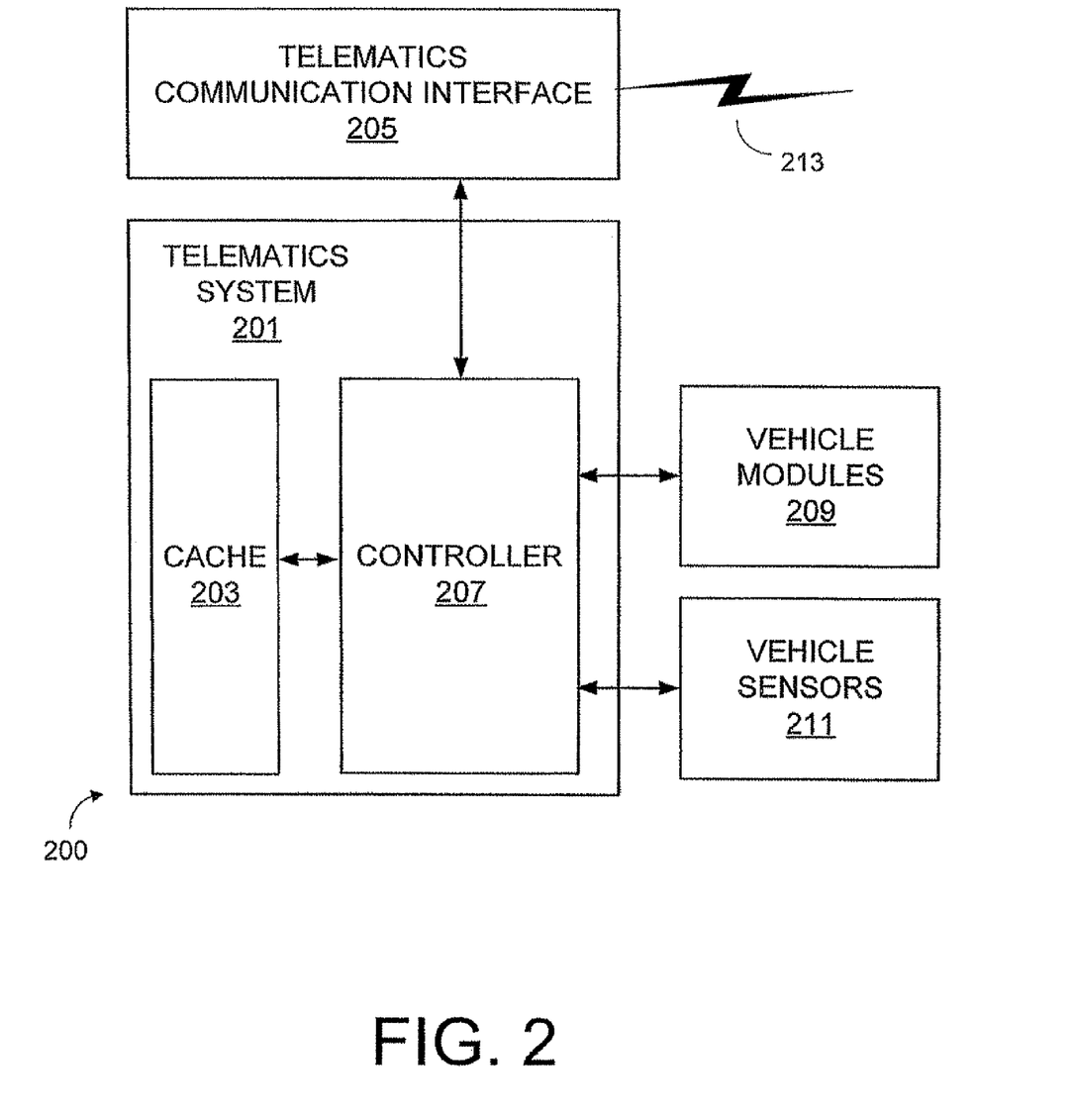
FIG. 2 is an abstracted schematic of a caching system according to one example of the invention.

FIG. 2 is a high level schematic of a caching system 200 according to one example of the invention. The telematics system 201, which illustrates certain portions of telematics unit 114 in greater detail, includes a cache 203, a communication interface 205, and a controller 207. The cache 203 may comprise all or part of any of one or more electronic memories 130, and is preferably, but not necessarily of a non-volatile memory type.

The communication interface 205 enables the telematics unit to communicate wirelessly with remote entities such as off-board call center 208. The communication interface 205 can be as described above with respect to vehicle communications device 112. The controller 207, which may comprise all or part of electronic processing device 128 and/or other processing facilities, controls the operation of the cache 203 and the communications interface 205.

In particular, the controller 207 coordinates the gathering of data from, and the passage of data or control information to, vehicle modules 209 (e.g., function-specific devices or modules 132-136), and sensors 211 (e.g., sensors 134) associated with the vehicle. Typically, the controller 207 will also be responsible for at least a portion of the processing of user input and output information.

In overview according to one example of the system, the telematics controller 207 provides caching of predetermined data to be available for pulling when the telematics unit is otherwise powered off. In particular, the telematics system 201 receives, during an on state, a communication via wireless link 213 from a remote entity such as a call center or service center specifying desired data to be later pulled from the unit 201. The telematics system 201 in turn accesses selected ones of the vehicle modules 209 and sensors 211 to acquire the requested data.

For example, the requested data may be satellite radio usage data, user calendar data, vehicle fluid levels, and so on. The telematics system 201 may also acquire other data determined by default, such as remaining oil life percentage and odometer information. In the absence of the remote request, the telematics system 201 would gather only the default information. It will be appreciated that the requested and default information may be gathered at the same or different times, and indeed, that various items of information within either class may be gathered at different times or at different intervals.

Having gathered the requested and default information, the telematics system 201 caches the information in cache 203. At a later point in time when the telematics system 201 is powered down, the cache 203 remains available via the telematics communication interface 205. Those of skill in the art will be familiar with the manner through which a cache is made available during a powered down state of the vehicle and telematics system generally. During off-peak hours of usage, the remote caller that requested the data may then contact the telematics device 201 again via channel 213 and read the cache 203 to retrieve the data of interest.

The manner in which the requested information is specified and cached is not critical in every example, but in one example, a remote request specifies the following values: time factor, bus message #1, optional bus message #2, bus message response to monitor, bus message response mask, and bitmap of bytes to store.

The time factor parameter specifies the interval, start time, periodicity, or other time factor indicating when messages are to be sent over the bus by the controller to pull specified data. For example, the timing factor may specify that the data is to be pulled after the expiration of 10 minutes with the motor running. Alternatively, the timing factor may specify that the data is to be gathered periodically, i.e., once every 24 hours, or once at a specified date and time. Certain values such as oil level do not change with high frequency, whereas other values, such as location, may change more quickly. In one example, the time factor is tailored to the type of data and frequency with which that data changes.

The bus message #1 parameter specifies a message to be provided by the controller over the bus to stimulate the retrieval of the necessary data. For example, in the case of a broadcast bus, the message may specify the target module, e.g., engine coolant level sensor, as well as the desired response parameter. Thus, in pseudocode, such a message would appear as [moduleID](parameter name).

In one example, a second message (and potentially other additional messages as well) is sent over the bus by the controller for data-gathering purposes. For example, the controller may be instructed to gather the parameters differently from different sensors or other modules. For example, some data may be gathered periodically, some may be gathered at a specified interval, and yet other data may be gathered at a given date and time, or upon the occurrence of a specific trigger event.

The bus message response mask specifies the manner in which return messages are filtered by the controller. For example, a module may be set to respond with a message containing undesired or extraneous information in addition to the requested information. Finally, the bitmap of bytes to store specifies the bytes of the masked response that are to be cached.

In an example, the caching process is triggered by a certain event. For example, the process may be triggered by the activation of the vehicle ignition. Alternatively, the process may be remotely triggered, such as by the remote requesting party, e.g., a call center.

Figure 3:
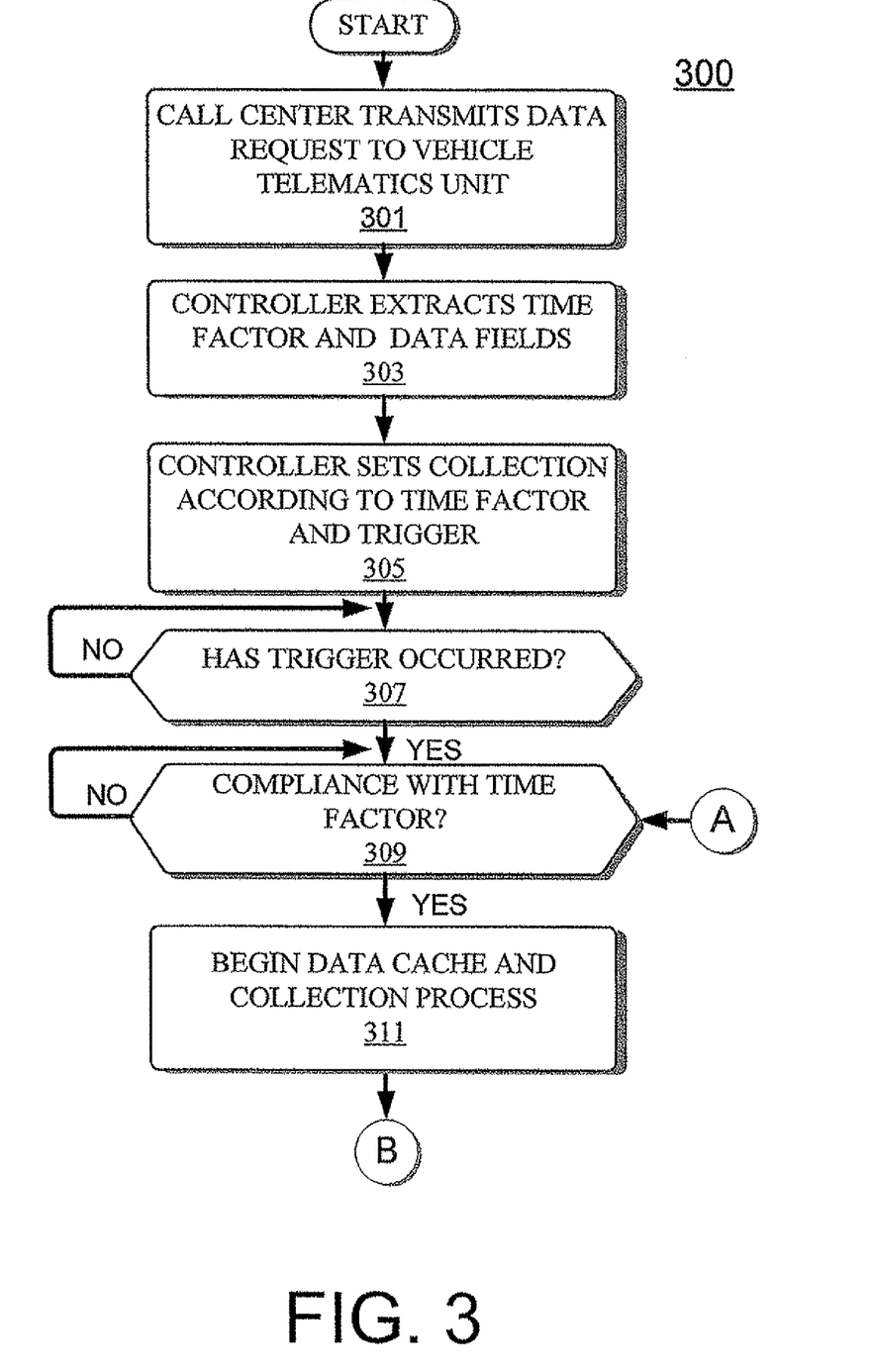
FIG. 3 is a flow chart illustrating an exemplary process of data caching according to an example of the invention.

The flow chart of FIG. 3 illustrates an exemplary process of data caching and retrieval in keeping with this disclosure. In overview, the process involves a request for data caching by a remote party such as a call center to a telemetric module in a vehicle. The request is acted upon and the specified data is cached, after which the remote party accesses the cache to retrieve the requested data.

In greater detail with reference to the process 300 of FIG. 3, at stage 301, a call center transmits a data request to a vehicle telematics unit. It will be appreciated that although the data request may be sent during off-peak hours during which a vehicle is unlikely to be in use, it is also possible for the request to be sent during other hours or for the vehicle to be in use during the off-peak hours. The request will typically although not invariably specify data that is available during peak hours, e.g. during operation of the vehicle.

As discussed above, the data request may contain a collection time factor and a number of data fields specifying the data to be collected. At stage 303, the controller processes the request to extract the time factor and the information contained in the data fields.

At stage 305, the controller sets the collection process to execute in accordance with the time factor and the trigger if any. The trigger may be a default event, e.g., engine ignition commencement, or it may be specified by the data request, e.g., attainment of a specified mileage.

At stage 307, it is determined whether the trigger has occurred. If the trigger has not occurred, the process continues to loop through stage 307. If on the other hand the trigger has occurred, the process continues to stage 309 whereupon compliance with the time factor is determined. For example, at this stage, the controller determines whether a specified time/date has arrived, whether a specified interval has expired, etc.

If it is determined at stage 309 that the time factor has not been met, then the process continues to loop through stage 309 awaiting compliance with the time factor. If instead it is determined at stage 309 that the time factor has been met, then the data cache and collection process flows begins at stage 311 which passes to stage 411 of the process 400 illustrated in FIG. 4.

Figure 4:
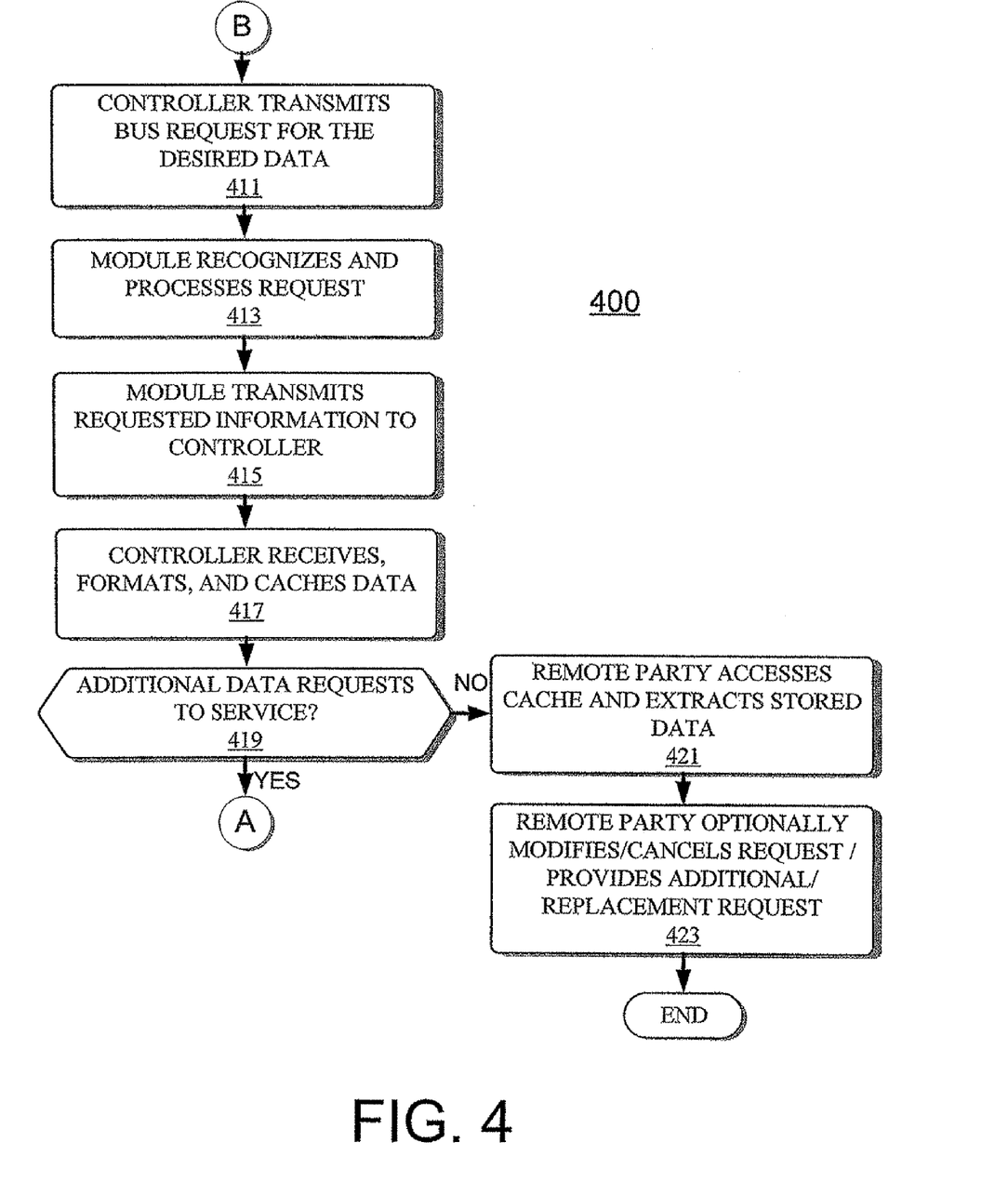
FIG. 4 is a flow chart illustrating an exemplary process of data caching and retrieval according to an example of the invention.

At stage 411, the controller transmits on the bus a request for the desired data. The request may specify the module to provide the data, the item of data required, the format of the data (e.g., units, average, range, etc.), and/or any other desired information needed to retrieve the specified information pursuant to desired parameters.

At stage 413, a targeted module recognizes the request message as directed to it, and processes the request. At stage 415, the targeted module transmits the requested information on the bus to the controller. At stage 417, the controller receives the data, formats it as needed, and transmits it to the cache for storage. If the request is non-recurring, the controller may clear the request from its memory at this stage.

At stage 419, the controller determines whether there are additional data requests to service. If so, the process returns to stage 409 to await compliance with the associated time factors and to continue from there. Otherwise, the process flows to stage 421.

At stage 421, which may occur a short or long while after the completion of stage 419, the remote party accesses the cache remotely and extracts the data stored therein. Typically, such access is during off-peak hours. As such, the vehicle may be off, and the telematics unit may be largely powered down. However, as discussed above, those of skill in the art will appreciate the manner in which the cache remains available to the remote caller even when the vehicle is off and the unit is generally powered down. In stage 423, the remote caller optionally modifies or cancels an existing data request and/or provides an additional or replacement request. After which the process terminates. It will be appreciated that any additional or replacement requests may be processed in keeping with the processes 300, 400.

Figure 5:
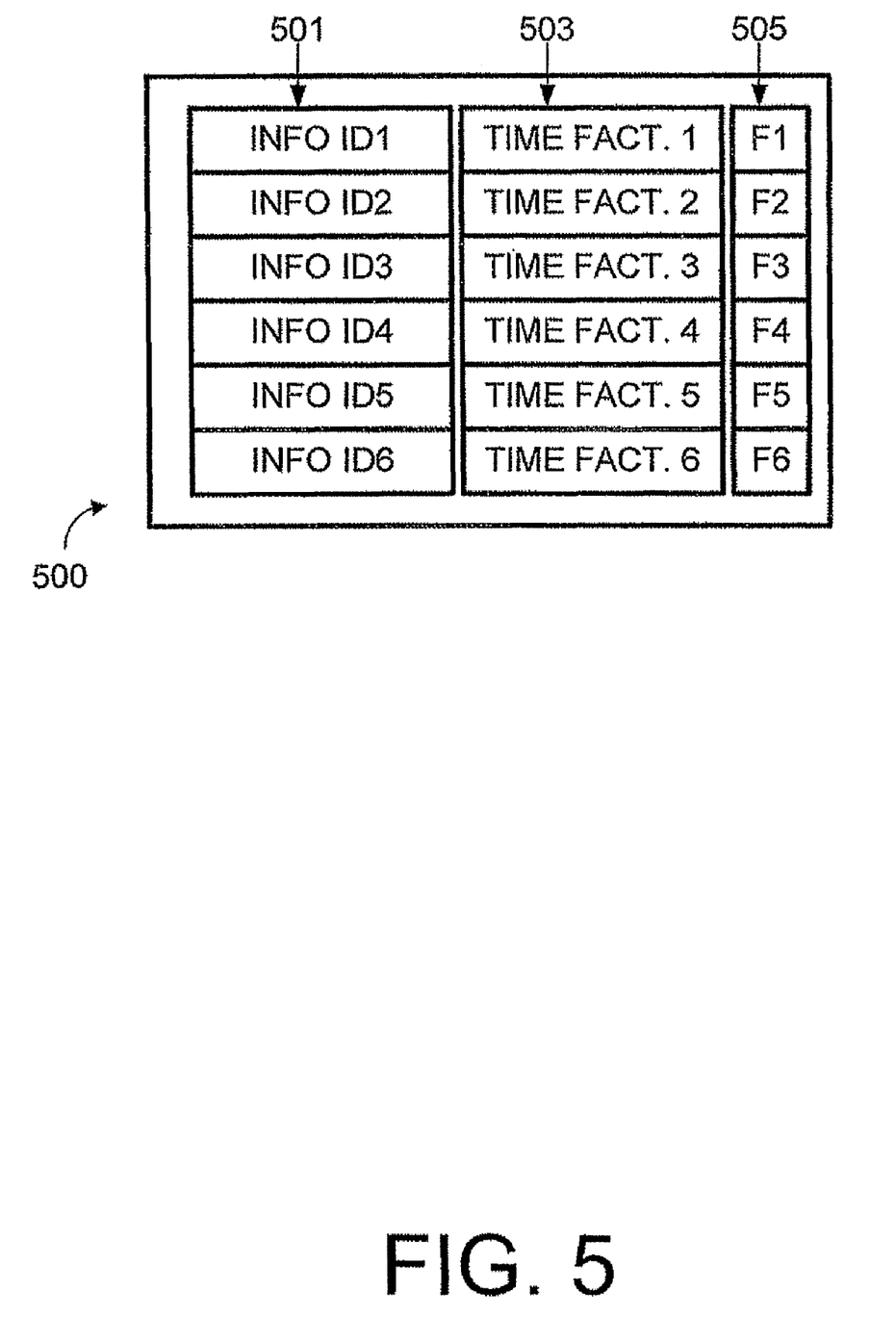
FIG. 5 is a data diagram illustrating a data field configuration maintained in one example by the telematics unit.

The data field diagram of FIG. 5 illustrates a data field configuration maintained in one example by the telematics unit. The data field 500 comprises a number of fields including a one or more information fields 501, each for storing an identifier of an item of information related to the mobile vehicle. A time factor field 503 stores a time factor value associated with each of the one or more information field 501 values. As discussed above, each time factor value defines the time at which the information identified in the associated information field is to be collected, according to an interval, a specific date and/or time, or another time-related value. The data field 500 may also comprise a flag field 505 associated with one or more information field 501 values to indicate that the information identified in the associated information field has been collected.

The data field 500 is usable by the controller 207 to determine what data needs to be collected and when that data should be collected. For example, if the flag for a particular information field 501 value indicates that the information has not been collected, then the controller will collect that information in keeping with the associated time factor.

The industrial applicability of the invention is wide spread. In particular, aspects of the invention provide a configurable bus storage cache mechanism that allows definable diagnostics and other information to be cached. Thus, not only can a telematics module cache predetermined data values such as remaining oil life percentage, odometer information, and DTCs, but also selected data such as PIDs and DIDs. In particular, the data of any module capable of delivering data to the controller can be selectively cached by the remote caller.

One example demonstrating the industrial applicability of the system disclosed herein is the caching of satellite radio (e.g., XM radio) usage data. Because the satellite radio usage information is typically stored in a module that is unavailable when the vehicle is off, the call center cannot pull the usage information unless the call center by chance calls when the driver is in the vehicle. With the system disclosed herein, instead of using VDU technology, for example, to get the vehicle to call back running, using peak hour rates, the call center can now selectively cache that data for later retrieval.

It will be appreciated that the foregoing methods and implementations for remote configurable data caching are merely examples, and that these illustrate a preferred technique. However, it is contemplated that other implementations of the invention may differ in detail from foregoing examples. As noted earlier, all references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of configuring a cache in a telematics unit in a mobile vehicle to selectively store information for later remote retrieval comprising:
    receiving a request transmission at the telematics unit from a first source remote to the telematics unit, wherein the request transmission identifies a set of information related to the mobile vehicle;
    querying a module within the vehicle from the telematics unit to provide at least a portion of the set of information;
    receiving the portion of the set of information at the telematics unit from the module; and
    caching the received portion of the set of information at the telematics unit in an off-line cache, wherein the off-line cache is available for querying by one or more remote sources when the telematics unit is powered down.

2. The method according to claim 1, further comprising:
    receiving a pull request from a second remote source at the telematics unit to provide at least a portion of the contents of the off-line cache to the second remote source; and
    transmitting the portion of the contents of the off-line cache to the second remote source.

3. The method according to claim 2, wherein the second remote source is the first remote source.

4. The method according to claim 1, wherein the first remote source is a call center.

5. The method according to claim 1, wherein the request transmission comprises one or more time factors that define one or more associated preferences as to when the identified set of information is to be gathered by the telematics unit.

6. The method according to claim 5, wherein at least one of the one or more time factors defines an interval at which the identified set of information is to be gathered by the telematics unit.

7. The method according to claim 5, wherein at least one of the one or more time factors defines a point in time at which the identified set of information is to be gathered by the telematics unit.

8. The method according to claim 1, wherein the identified set of information comprises satellite radio usage information.

9. The method according to claim 1, wherein the identified set of information comprises satellite radio usage information.

10. The method according to claim 1, wherein the off-line cache is available for querying by the one or more remote sources when the telematics unit is powered on.

11. The method according to claim 1, wherein the step of querying a module within the vehicle is preceded by a step of determining that a predefined trigger event has occurred.

12. The method according to claim 11, wherein the predefined trigger event is the activation of the ignition circuit of the mobile vehicle.

13. A computer-readable medium having stored thereon a computer-readable structure for use in caching information related to the mobile vehicle in an offline cache, the structure comprising:
    one or more information fields, each for storing an identifier of an item of information related to the mobile vehicle; and
    a time factor field for storing a time factor value associated with each of the one or more information fields, wherein each time factor value defines a factor defining when the information identified in the associated information field is to be collected.

14. The computer-readable medium according to claim 13, further comprising a flag field associated with one or more information fields to indicate that the information identified in the associated information field has been collected.

15. A method of remotely configuring an off-line cache in a mobile vehicle telematics unit to selectively store information for later remote retrieval, wherein the off-line cache is available to be queried when the mobile vehicle telematics unit is powered off, the method comprising:
    constructing an off-line cache request comprising one or more information identifiers specifying information to be cached and one or more time factors associated respectively with the one or more information identifiers stipulating a time value in keeping with which the associated information is to be collected; and remotely sending a request transmission to the telematics unit, wherein the request transmission comprises the off-line cache request.

16. The method according to claim 15, wherein at least one of the one or more time factors defines a periodic interval at which the information specified by the associated information identifier is to be cached.

17. The method according to claim 15, wherein at least one of the one or more time factors defines a point in time at which the information specified by the associated information identifier is to be cached.

18. The method according to claim 15, further comprising sending a pull transmission to the mobile vehicle telematics unit, wherein the pull transmission comprises a request for the telematics unit to send information from the off-line cache in response to the request.

19. The method according to claim 18, further comprising receiving from the mobile vehicle telematics unit information from the off-line cache.

20. The method according to claim 19, wherein at least a portion of the information from the off-line cache comprises information identified in the off-line cache request.

* * * * *